US008737240B2

(12) United States Patent
Nakata (10) Patent No.: US 8,737,240 B2
(45) Date of Patent: May 27, 2014

(54) LINK BAND ESTIMATING APPARATUS AND LINK BAND ESTIMATING METHOD

(75) Inventor: Tsuneo Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 113 days.

(21) Appl. No.: 12/601,560

(22) PCT Filed: Mar. 11, 2008

(86) PCT No.: PCT/JP2008/054355
§ 371 (c)(1),
(2), (4) Date: Nov. 24, 2009

(87) PCT Pub. No.: WO2008/146518
PCT Pub. Date: Dec. 4, 2008

(65) Prior Publication Data
US 2010/0165863 A1 Jul. 1, 2010

(30) Foreign Application Priority Data

May 28, 2007 (JP) ................................. 2007-140168

(51) Int. Cl.
*H04L 1/00* (2006.01)
(52) U.S. Cl.
USPC ........................................................ 370/252
(58) Field of Classification Search
USPC ...................... 370/229–235, 237–238.1, 252, 370/395.5–395.52, 464–468, 473
See application file for complete search history.

(56) References Cited

U.S. PATENT DOCUMENTS

| 6,850,541 | B2 * | 2/2005 | Gross | 370/473 |
| 7,035,220 | B1 * | 4/2006 | Simcoe | 370/236 |
| 7,151,749 | B2 * | 12/2006 | Vega-Garcia et al. | 370/241.1 |
| 7,443,804 | B2 * | 10/2008 | Cheung et al. | 370/252 |
| 7,525,923 | B2 * | 4/2009 | Matta | 370/252 |
| 7,545,749 | B2 * | 6/2009 | Jourdain et al. | 370/235 |
| 7,558,202 | B2 * | 7/2009 | Luo et al. | 370/232 |
| 7,729,268 | B2 * | 6/2010 | Matta et al. | 370/252 |

FOREIGN PATENT DOCUMENTS

| JP | 2003218938 A | 7/2003 |
| JP | 2004524782 A | 8/2004 |
| JP | 2004312725 A | 11/2004 |
| JP | 2005057487 A | 3/2005 |
| JP | 2005210671 A | 8/2005 |
| JP | 2006261755 A | 9/2006 |
| KR | 2006-0122901 A | 11/2006 |
| WO | 2005069558 A | 7/2005 |

OTHER PUBLICATIONS

Saito et al, Evaluation of Traffic Dispersion Methods for Synchronous Distributed Multimedia Data Transmission on Multiple Links, IEEE, 6 pages, 2003.*

(Continued)

*Primary Examiner* — Frank Duong
(74) *Attorney, Agent, or Firm* — Sughrue Mion, PLLC (57) ABSTRACT

A link band estimating apparatus includes a packet transmitting unit for transmitting packets in succession via a route portion of communication routes which share a link to be measured. The apparatus includes a packet interval measuring unit for measuring an interval by which the packets are spaced apart in another route portion of the communication routes. The apparatus includes a band calculating unit for calculating the band of the link to be measured based on a value measured by the packet interval measuring unit and a data size of the packets.

6 Claims, 7 Drawing Sheets

(56) References Cited

OTHER PUBLICATIONS

Li et al, Packet Dispersion in IEEE 802.11 Wireless Networks, IEEE, 9 pages, 2006.*
Dovrolis et al, Packet-Dispersion Techniques and a Capacity-Estimation Methodology, IEEE, 15 pages, Dec. 2004.*
International Search Report for PCT/JP2008/054355 mailed Jun. 17, 2008.
T. Nakata et al., "Efficient bundling of heterogeneous radio resources for broadband Internet access from moving vehicles," in proceedings of Global Mobile Congress 2004, Oct. 11-13, 2004, Shanghai, China.
C. Dovrolis et al., "What do packet dispersion techniques measure?", proceedings of IEEE INFOCOM 2001, pp. 905-914, 2001.
Korean Office Action for KR10-2009-7027075 issued Apr. 27, 2011.
Supplementary European Search Report for EP 08 72 1771 issued Feb. 1, 2012.
R. L. Carter et al., "Measuring Bottleneck Link Speed in Packet-Switched Networks", XP002523009, Retrieved from the internet: URL:http://citeseerx.ist.psu.edu/viewdoc/summary?doi=10.1.1.30.156, [retrieved on Jan. 19, 2012], March 15, 1996, pp. 1-24.
K. Lai et al., "Nettimer: A Tool for Measuring Bottleneck Link Bandwidth", XP002667586, Proceedings of the USENIX Symposium on Internet Technologies and Systems, Retrieved from the Internet:URL:http://citeseerx.ist.psu.edu/viewdoc/download;jsessionid=1981E13CBB8DC16ABCE48D86A7236430?doi=10.1.1.22.9081&rep=rep1&type=pdf, [retrieved on Jan. 19, 2012], Jan. 29, 2001.

* cited by examiner

LINK BAND ESTIMATING APPARATUS AND LINK BAND ESTIMATING METHOD

TECHNICAL FIELD

The present invention relates to a link band estimating apparatus and a link band estimating method for estimating the bands of a plurality of communication routes when communications are to be carried out using the communication routes, and more particularly to a link band estimating apparatus and a link band estimating method for estimating the bands of a plurality of communication routes in order to effectively utilize the bands when the communication routes are to be bundled together for a wider band.

BACKGROUND ART

The technology called "Mobile Inverse Mux" (see, for example, the document T. Nakata et al., "Efficient bundling of heterogeneous radio resources for broadband Internet access from moving vehicles," in proceedings of Global Mobile Congress 2004, Oct. 11-13, 2004, Shanghai, China, and JP-A No. 2005-210671 (Paragraph 0312, FIG. 12)) is drawing attention as a technology for accessing the Internet from a moving vehicle such as a train traveling at a high speed in the range from 100 to 300 km per hour, a bus, or the like. This technology serves to achieve a wider band and increase the stability of communications by combining a plurality of communication modules such as of wireless LAN (Local Area Network) and cellular phone. In particular, for bundling a plurality of unstable communication routes for a wider band, it is necessary to monitor band fluctuations of the routes in order to effectively utilize the bands of the respective routes.

One process of measuring the band of a route between two nodes is known as a packet dispersion process for simultaneously transmitting a plurality of packets called a packet pair or a packet train from a transmission side, measuring a reception interval of the packets on a reception side, and estimating a band from the result of the measurement (see, for example, the document C. Dovrolis, P. Ramanathan and D. Moore, "What do packet dispersion techniques measure?," proceedings of IEEE INFOCOM 2001, pp 905-914 (2001)). According to this process, the band of a link which causes a bottleneck to be created on the entire route is measured. Consequently, if the route includes a single wireless link, then the process can serve as a method for measuring the band of the wireless link.

A situation will be considered wherein nodes that communicate with each other are in a mobile environment and are connected to each other by a plurality of wireless links. In such a situation, it is necessary that any route between the nodes go through plural wireless links such as two wireless links. The total band of the entire route changes depending on the combination of wireless links through which packets are transmitted. Therefore, it is desirable to determine a combination of wireless links which can utilize the band most effectively after measuring the bands of all bottleneck candidates. According to the measurement of the bands of routes based on the related art of the present invention, however, it has been impossible to identify a bottleneck link in two wireless (narrowband) zones.

If there are a plurality of bottleneck candidate links such as wireless links in routes, then only low rate bands thereof are measured. As bottleneck links cannot be identified, there has been a problem in that it cannot be specified which links the measured values correspond to. Moreover, there is another problem in that the bands of links which do not serve as bottlenecks cannot be measured.

DISCLOSURE OF THE INVENTION

It is an object of the present invention to provide a link band estimating apparatus and a link band estimating method for measuring the band of a bottleneck candidate included in each of a plurality of routes between two nodes which can use the routes.

According to the present invention, a link band estimating apparatus includes (a) packet transmitting means for transmitting a plurality of packets in succession via a route portion of a plurality of communication routes which share a link to be measured, (b) packet interval measuring means for measuring an interval by which said packets are spaced apart in another route portion of the communication routes, and (c) band calculating means for calculating the band of the link to be measured based on a value measured by said packet interval measuring means and a data size of said packets.

According to the present invention, specifically, the packet transmitting means transmits a plurality of packets in succession via a route portion of a plurality of communication routes which share a link to be measured, i.e., transmits the packets in a manner in which a load is created on the route portion. When the parts are spaced apart by an interval in another route portion of the communication routes, the band of the link to be measured is calculated and estimated from the relationship with respect to the data size of the packets. The data size may be acquired by data size measuring means provided in a reception node or by being specified in advance. With the latter approach, if the size of packets to be transferred which are actually entered from an external node is different from the data size that is specified in advance, then the packets may be divided, a plurality of data may be superposed, or dummy data may be inserted.

According to the present invention, a link band estimating apparatus includes (a) packet transmitting means for transmitting a plurality of packets in succession to a plurality of communication routes which share one end of a link to be measured and which has a band narrower than the link to be measured, (b) packet receiving means for receiving the packets transmitted by said packet transmitting means from another end of said link to be measured, (c) arrival interval measuring means for measuring an arrival interval of the packets received by said packet receiving means, and (d) band calculating means for calculating the band of the link to be measured from a measured result from said arrival interval measuring means.

According to the present invention, specifically, packets are transmitted in succession from a plurality of communication routes which share one end of a link to be measured, and are received at the other end of the link to be measured. An arrival interval of the packets is measured when they are received, and the band of the link to be measured is calculated from the measured result.

According to the present invention, a link band estimating apparatus includes (a) packet transmitting means for transmitting a plurality of packets in succession from one end of a link to be measured, (b) packet receiving means for receiving the packets from a plurality of communication routes which share another end of said link to be measured and which have a total band wider than, but individual bands each narrower than, the band of said link to be measured, (c) arrival interval measuring means for measuring an arrival interval of the packets received by said packet receiving means, and (d) band calculating means for calculating the band of the link to be measured from a measured result from said arrival interval measuring means.

According to the present invention, specifically, packets are transmitted in succession from one end of a link to be measured which has a relatively wide band, and an arrival interval of the packets received respectively via a plurality of communication routes which are connected to the other end of the link to be measured. The band of the link to be measured is calculated from the measured result.

According to the present invention, a link band estimating method comprises (a) the packet delivering step of delivering a plurality of packets in succession via a route portion of a plurality of communication routes which share a link to be measured, (b) the packet interval measuring step of measuring an interval by which said packets delivered by said packet delivering step are spaced apart in a zone of the communication routes, and (c) the band calculating step of calculating the band of the link to be measured from a measured value from said packet interval measuring step and a data size of said packets.

According to the present invention, specifically, packets are transmitted in succession from a plurality of communication routes which share one end of a link to be measured, and are received at the other end of the link to be measured. An arrival interval of the packets is measured when they are received, and the band of the link to be measured is calculated from the measured result.

The band of the link to be measured is measured based on the fact that packets are dispersed differently based on different bands of components of a plurality of routes between two nodes which can use the routes. The band can thus be estimated when necessary simply by monitoring the state of the packets under given conditions.

BEST MODE FOR CARRYING OUT THE INVENTION

Examples of the present invention will be described in detail below.

Example 1

Figure 1:
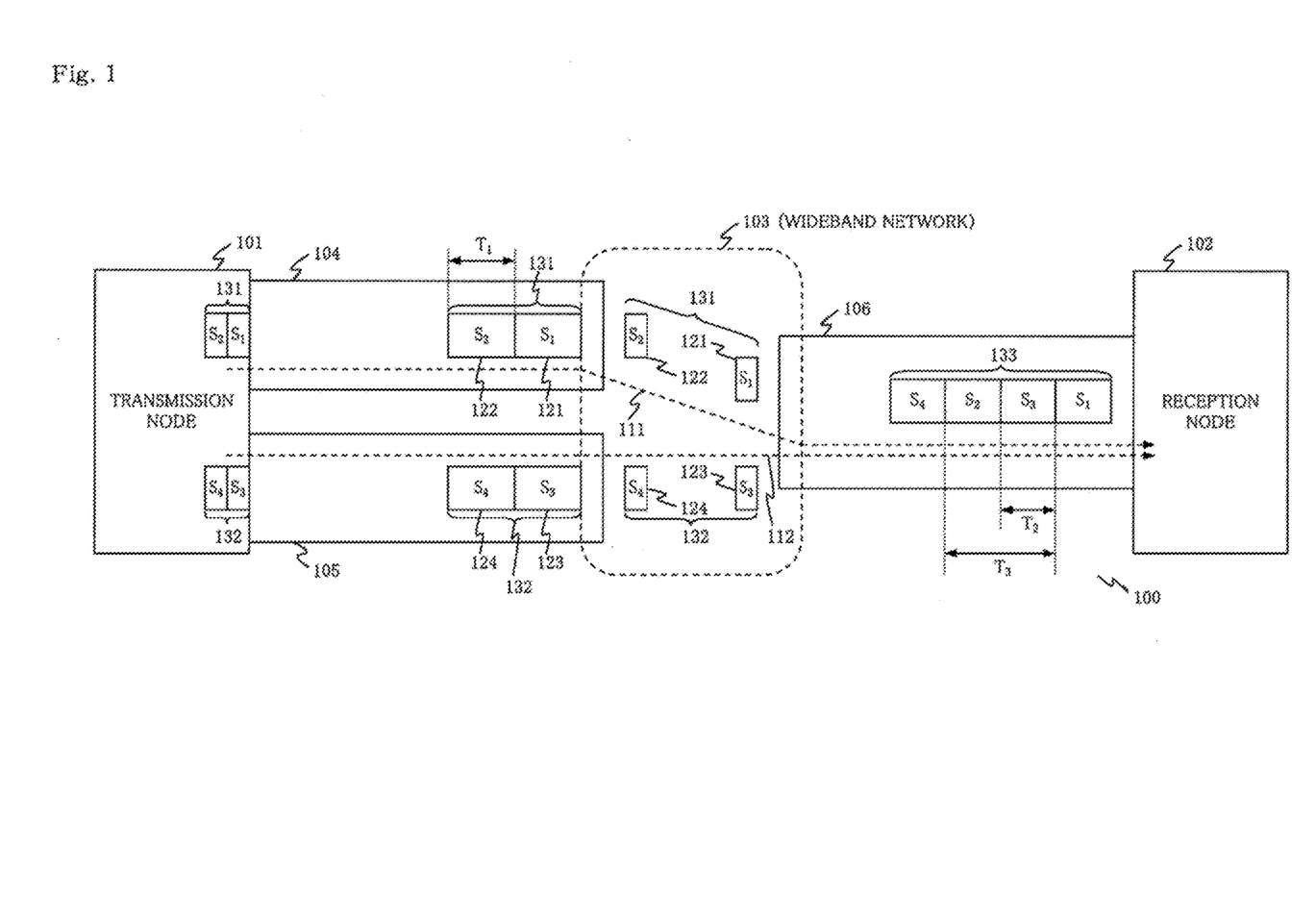
FIG. 1 is a system configuration diagram showing the configuration of a link band estimating system according to a first example of the present invention.

FIG. 1 shows the configuration of a link band estimating system according to a first example of the present invention. Link band estimating system 100 includes transmission node 101 for transmitting packets and reception node 102 for receiving the packets transmitted from transmission node 101. Transmission node 101 comprises a first communication apparatus, not shown, for transmitting moving images via a wireless path, for example, and reception node 102 comprises a second communication apparatus, not shown, mounted on a moving vehicle, for example.

Wideband network 103 is present in communication routes between transmission node 101 and reception node 102. First narrowband link 104 and second narrowband link 105 are connected parallel to each other between transmission node 101 and wideband network 103. Third narrowband link 106 is connected between wideband network 103 and reception node 102.

Link band estimating system 100 has two types of transmission routes for transmitting packets from transmission node 101 to reception node 102. Of these transmission routes, first transmission route 111 is a route which extends from transmission node 101 through first narrowband link 104 to wideband network 103 and from thence through third narrowband link 106 to reception node 102, as indicated by the broken lines in FIG. 1. Second transmission route 112 is a route which extends from transmission node 101 through second narrowband link 105 to wideband network 103 and from thence through third narrowband link 106 to reception node 102, as indicated by the broken lines in FIG. 1.

It is assumed in link band estimating system 100 that wideband network 103 has a band allowance large enough not to produce bottlenecks that serve as band limitations while first through third narrowband links 104 through 106 are placed under a maximum load. In other words, the possibility of producing bottlenecks is limited to any one of first through third narrowband links 104 through 106.

Transmission node 101 transmits first packet train 131 comprising first and second packets 121, 122 which have successive first sequence number $S_1$ and second sequence number $S_2$, via first transmission route 111. At the same start time as that of first packet train 131, transmission node 101 transmits second packet train 132 comprising third and fourth packets 123, 124 which have successive third sequence number $S_3$ and forth sequence number $S_4$, via second transmission route 112. For the sake of brevity, all first through fourth packets 121 through 124 comprise packets of the same data size.

First and second packets 121, 122 reach wideband network 103 as first packet train 131. It is assumed that first and second packets 121, 122 reach wideband network 103 at time interval $T_1$. Then, time interval $T_1$ is equal to a transmission delay that is determined by the band of first narrowband link 104.

In FIG. 1, it is assumed that the widths of first through fourth packets 121 through 124 represent transmission delays which they undergo. The transmission delays of first narrowband link 104 and second narrowband link 105 are not significantly different from each other. On third narrowband link 106, first through fourth packets 121 through 124 are narrower than those on first and second narrowband links 104, 105. Therefore, the transmission delay of third narrowband link 106 is smaller than the transmission delays of first narrowband link 104 and second narrowband link 105. Furthermore, the transmission delay of wideband network 103 is much smaller.

Second packet 122 of first packet train 131 reaches wideband network 103 having a delay of packet arrival interval $T_1$ with respect to first packet 121. Since the transmission delay of wideband network 103 is small, first packet 121 and second packet 122 reach the start point of third narrowband link 106 while keeping packet arrival interval $T_1$ therebetween.

It is assumed that the transmission delay which third and fourth packets 123, 124 of second packet train 132 undergo is greater than the transmission delay which first packet 121 undergoes, and is smaller than packet arrival interval $T_1$. In this case, first packet 121 first reaches the start point of third narrowband link 106. Then, the third packet reaches the start point of third narrowband link 106 before second packet 122. Therefore, first packet 121, third packet 123, second packet 122, and fourth packet 124 reach the start point of third narrowband link 106 in the order named. Then, they enter reception node 102 as combined packet train 133 at packet arrival interval $T_2$ which is determined by the transmission delay of third narrowband link 106. Second packet 122 of first packet train 131 now enters reception node 102 at increased entry interval $T_3$ from first packet 121.

For the sake of brevity, it is assumed that first packet 121 having first sequence number $S_1$ and third packet 123 having third sequence number $S_3$ enter third narrowband link 106 substantially simultaneously, with first sequence number $S_1$ being earlier. If entry interval $T_3$ is greater than packet arrival interval $T_1$ as shown, then the transmission delay relative to first packet 121 and third packet 123 determines the delay relative to third packet 122 which follows first packet 121 and third packet 123.

The reason for the delay thus determined will be described below. The transmission delay of wideband network 103 is smaller than the transmission delay of first narrowband link 104. Therefore, the delay of second packet 122 which is caused with respect to first packet 121 by first narrowband link 104 is not increased until second packet 122 enters third narrowband link 106. Consequently, if the arrival interval of second packet 122 having second sequence number $S_2$ with respect to first packet 122 having first sequence number $S_1$ is greater than packet arrival interval $T_1$, then the difference between the intervals may be considered to be caused by the transmission delay which is newly caused by third narrowband link 106.

The band of third narrowband link 106 can be estimated by measuring entry interval $T_3$ and by dividing measured entry interval. $T_3$ by the total size of third packet 123 and second packet 122. When considering a condition for making entry interval $T_3$ greater than packet arrival interval $T_1$, it is assumed that the band of first narrowband link 104 and the band of second narrowband link 105 are the same as each other. The condition is satisfied if the band of third narrowband link 106 is wider than the band of first narrowband link 104, but is narrower than twice the band of first narrowband link 104.

A general explanation will be made below. It is assumed that a plurality of routes R1, R2, . . . RN, not shown, share a narrowband link L, not shown, to be measured. It is also assumed that routes R1, R2, . . . RN have single link X, not shown, which could be a bottleneck candidate, other than narrowband link L, positioned more closely to the transmission node than narrowband link L. In this case, if the band of narrowband link L is narrower than the total band of link X as a bottleneck candidate other than narrowband link L, then the band of narrowband link L can be measured by the same process as with the present example.

According to the first example, as described above, even if the band of third narrowband link 106 is wider than the band of first narrowband link 104 and the band of second narrowband link 105, then the band of third narrowband link 106 can be measured based on a packet dispersion. The process according to the background art which transmits a packet train to a single route is unable to measure the band of third narrowband link 106 which does not serve as a bottleneck in either first transmission route 111 or second transmission route 112. The term "packet dispersion" refers to a chronological spread from leading to trailing ends of packets which is caused by a transmission delay. No dispersion occurs in a region where links are placed under no load.

Figure 2:
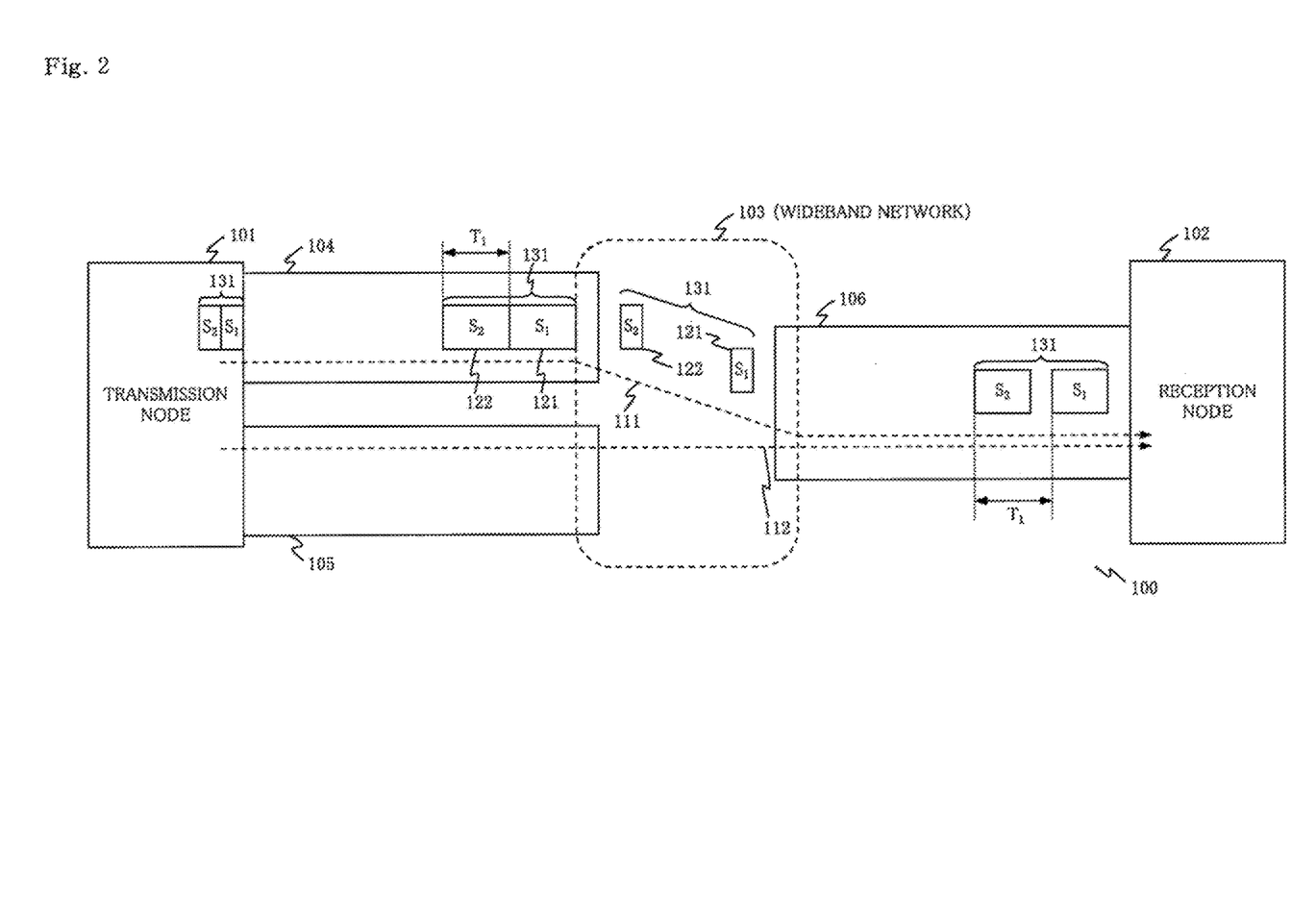
FIG. 2 is a diagram illustrating a mode in which only a first packet train is transmitted in the first example.

FIG. 2 shows a mode in which only the first packet train is transmitted. For comparison between the process according to the background art and the process according to the first example, it is assumed that transmission node 101 transmits first packet train 131 comprising first and second packets 121, 122 to only first transmission route 111. First and second packets 121, 122 reach reception node 102 at an arrival interval which is equal to the arrival interval at which they reach wideband network 103, and is represented by packet arrival interval $T_1$. In this case, the arrival interval at which first and second packets 121, 122 reach reception node 102 reflects the band of first narrowband link 104 which is the narrowest band of first transmission route 111. At this time, the band of third narrowband link 106 is not reflected in the arrival interval of first and second packets 121, 122.

Figure 3:
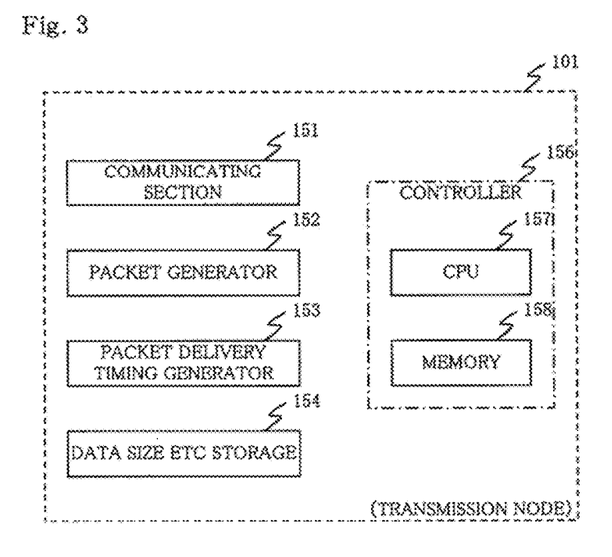
FIG. 3 is a block diagram showing a brief circuit arrangement of a transmission node in the first example.

FIG. 3 shows a brief circuit arrangement of the transmission node used in the link band estimating system according to the first example. Transmission node 101 includes communicating section 151 having a normal node communication function, packet generator 152 for generating first through fourth packets 121 through 124 to be transmitted to first narrowband link 104 and second narrowband link 105 shown in FIG. 1, packet delivery timing generator 153 for generating delivery timings (clocks) for first through fourth packets 121 through 124, and data size etc storage 154 for storing data sizes of first through fourth packets 121 through 124, and data indicative of the number of packets to be delivered. Controller 156 is a circuit section for controlling the transmission node as a whole, and includes CPU (Central Processing Unit) 157 and memory 158. Memory 158 stores control programs and also serves as a working memory. When CPU 157 executes the control programs, at least a portion of the various components of transmission node 101 can be implemented by software.

Figure 4:
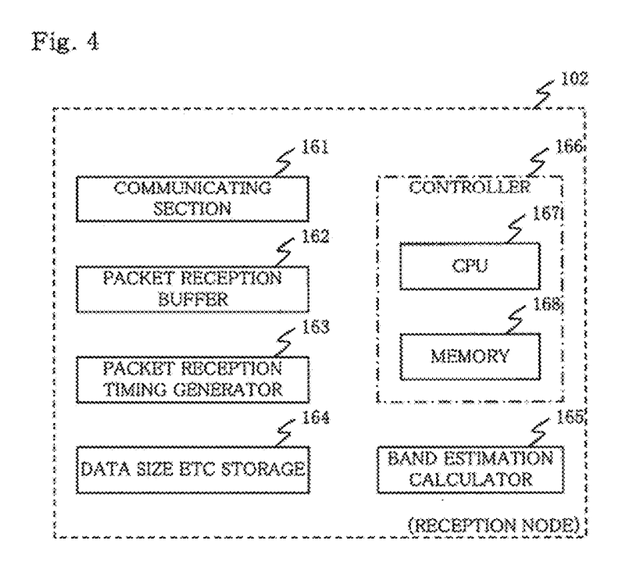
FIG. 4 is a block diagram showing a brief circuit arrangement of a reception node in the first example.

FIG. 4 shows a brief circuit arrangement of the reception node used in the link band estimating system according to the first example. Reception node 102 includes communicating section 161 having a normal node communication function, packet reception buffer 162 for storing first through fourth packets 121 through 124 received from third narrowband link 106 shown in FIG. 1, packet reception timing generator 163 for generating reception timings (clocks) for first through fourth packets 121 through 124, data size etc storage 164 for storing data sizes of first through fourth packets 121 through 124, and data indicative of the number of packets delivered, and band estimation calculator 165 for performing a calculating operation to estimate the band of third narrowband link 106 from the relationship of the timings of first through fourth packets 121 through 124. Controller 166 is a circuit section for controlling the reception node as a whole, and includes CPU (Central Processing Unit) 167 and memory 168. Memory 168 stores control programs and also serves as a working memory. When CPU 167 executes the control programs, at least a portion of the various components of reception node 102 can be implemented by software.

According to the first example, as described above, packet trains (first packet train 111 and second packet train 112 in this example) are simultaneously supplied to a plurality of routes (first transmission route 111 and second transmission route 112 in this example) which include a link to be measured thereon. If each route includes links serving as two or more bottleneck candidates, then one of the bottleneck candidate links is regarded as a link to be measured, and a plurality of routes which share the link to be measured are simultaneously placed under a load, so that the band of a link (third narrowband link 106 in this example) which does not serve as a bottleneck on the routes can be measured according to a packet dispersion process.

Example 2

According to the first example, as described above, if a link to be measured is located near reception node 102 shown in FIG. 1, a plurality of routes which share the link to be measured are simultaneously placed under a load, making it possible to measure the band of the link to be measured. According to the second example, a link to be measured is located near the transmission node.

Figure 5:
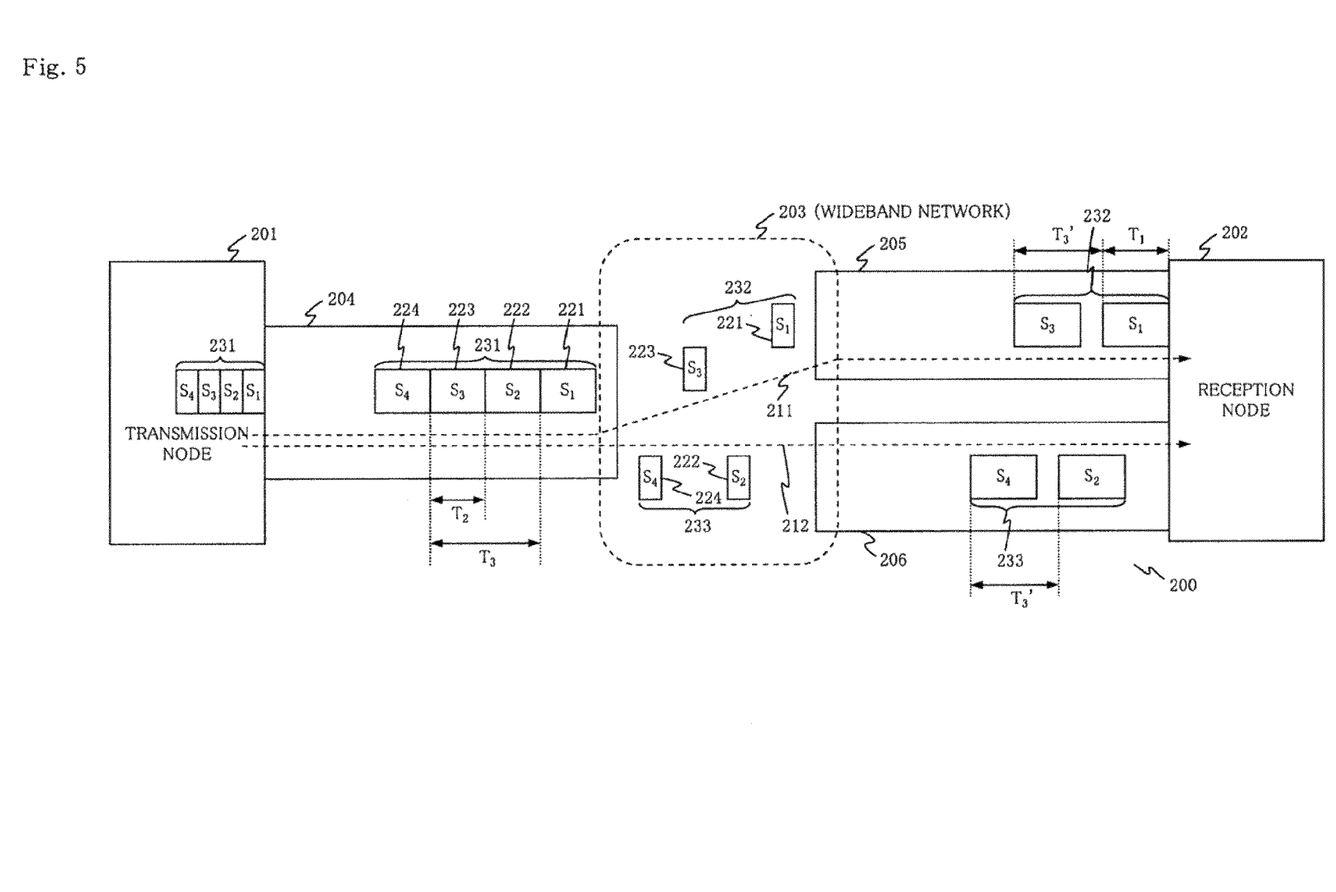
FIG. 5 is a system configuration diagram showing the configuration of a link band estimating system according to a second example of the present invention.

FIG. 5 shows the configuration of a link band estimating system according to the second example of the present invention. Link band estimating system 200 includes transmission node 201 for transmitting packets and reception node 202 for receiving the packets transmitted from transmission node 201. Transmission node 201 comprises a first communication apparatus, not shown, for transmitting moving images via a wireless path, for example, and reception node 202 comprises a second communication apparatus, not shown, mounted on a moving vehicle, for example.

Wideband network 203 is present in communication routes between transmission node 201 and reception node 202. First narrowband link 204 is connected between transmission node 201 and wideband network 203. Second narrowband link 205 and third narrowband link 206 are connected parallel to each other between wideband network 203 and reception node 202.

Link band estimating system 200 has two types of transmission routes for transmitting packets from transmission node 201 to reception node 202. Of these transmission routes, first transmission route 211 is a route which extends from transmission node 201 through first narrowband link 204 to wideband network 203 and from thence through second narrowband link 205 to reception node 202, as indicated by the broken lines in FIG. 5. Second transmission route 212 is a route which extends from transmission node 201 through first narrowband link 204 to wideband network 203 and from thence through third narrowband link 206 to reception node 202, as indicated by the broken lines in FIG. 5.

It is assumed in link band estimating system 200 that wideband network 203 has a band allowance large enough not to produce bottlenecks serving as band limitations while first through third narrowband links 204 through 206 are placed under a maximum load. In other words, the possibility of producing bottlenecks is limited to any one of first through third narrowband links 204 through 206. It is also assumed that the bands of second narrowband link 205 and third narrowband link 206 are the same as each other, and each of these bands is narrower than the band of first narrowband link 204.

Transmission node 201 transmits first packet train 231 comprising first through fourth packets 221 through 224 which have first through fourth sequence numbers $S_1$ through $S_4$, via first transmission route 211 and second transmission route 212. For the sake of brevity, all first through fourth packets 121 through 124 comprise packets of the same data size.

If the band of second narrowband link 205 is equal to or wider than the band of first narrowband link 204, then first through fourth packets 221 through 224 of first packet train 231 transmitted from transmission node 201 are successively transferred via second narrowband link 205 as is. However, the band of second narrowband link 205 is narrower than the band of first narrowband link 204 and is equal to the band of third narrowband 206. Therefore, when first packet 221 is transferred to second narrowband link 205, second packet 222 does not wait to be transferred at second narrowband link 205, but is transferred to third narrowband link 206 as is.

The band of first narrowband link 204 is wider than, but narrower than twice, the band of second and third narrowband links 205, 206. Therefore, first through fourth packets 121 through 124 are transferred alternately, one packet at a time, to second narrowband link 205 and third narrowband link 206 without waiting. Specifically, first packet 221 is transferred to second narrowband link 205, and then second packet 222 is transferred to third narrowband link 206. Then, third packet 223 is transferred to second narrowband link 205, and finally fourth packet 224 is transferred to third narrowband link 206.

The differences between the times at which first through fourth packets 121 through 124 start being transferred to second and third narrowband links 205, 206 are equal to dispersion $T_2$ which represents the differences between the times at which first through fourth packets 121 through 124 were transferred via first narrowband link 204 because the band of wideband network 203 prior to second and third narrowband links 205, 206 is sufficiently wide. However, since packets 221 through 224 start being transferred, with alternate packets missing, via second and third narrowband links 205, 206, time difference $T_3'$ between the packets is equal to time difference $T_3$ as a timing difference with which two packets are transferred via first narrowband link 204. Generally, the dispersion and the time differences are related according to the following equation (1):

$$T_3' \ge T_3 = 2T_2 \quad (1)$$

In second narrowband link 205 and third narrowband link 206, dispersion. $T_1$ is caused by the packet arrival interval of each packet. Dispersion $T_1$ is greater than dispersion $T_2$ caused in first narrowband link 201. Second packet train 232 comprises first and third packets 221, 223. Difference $T_3'$ between the arrival times at which first and third packets 221, 223 reach reception node 202 is indicated by the equation (1). The inequality of equation (1) is satisfied when dispersion $T_1$ is greater than difference $T_3'$ between the arrival times.

The condition that the band of first narrowband link 204 is wider than, but is narrower than twice, the band of second narrowband link 205 and third narrowband link 206, is satisfied when dispersion $T_1$ is smaller than difference $T_3$ as shown in FIG. 5. In this case, the equation (1) changes to an equality expressed by the following equation (2):

$$T_3' = T_3 = 2T_2 \quad (2)$$

This also holds for arrival time difference $T_3'$ of second and fourth packets 222, 224 of third packet train 233. In this case, it can be assumed according to the same principle as with the first example that reception time difference $T_3'$ of first and third packets 221, 223 at reception node 202 is caused by a dispersion of two packets in first narrowband link 204. If the size of each of first through fourth packets 221 through 224 is represented by PS, then band B1 of first narrowband link 204 is estimated according to the following equation (3):

$$B1 = PS \times 2 \div T_3 \quad (3)$$

According to the second example of the present invention, as described above, if a link to be measured (first narrowband link 204) is located near the transmission side, the band of the link to be measured can be calculated using dispersion $T_2$ caused by first narrowband link 201 or arrival time difference $T_3'$ of second narrowband link 205 (third narrowband link 206).

The arrangements of transmission node 201 and reception node 202 of link band estimating system 200 according to the second example are essentially identical to those shown in FIGS. 3 and 4, and will not be illustrated and described below.

Example 3

In the first and second examples described above, all packets to be used for measuring a band are transmitted from transmission node 101 (201) to reception node 102 (202). According to the third example, the reception node has a plurality of communication interfaces, and some of the packets that are used for measuring a band are supplied from the reception node.

Figure 6:
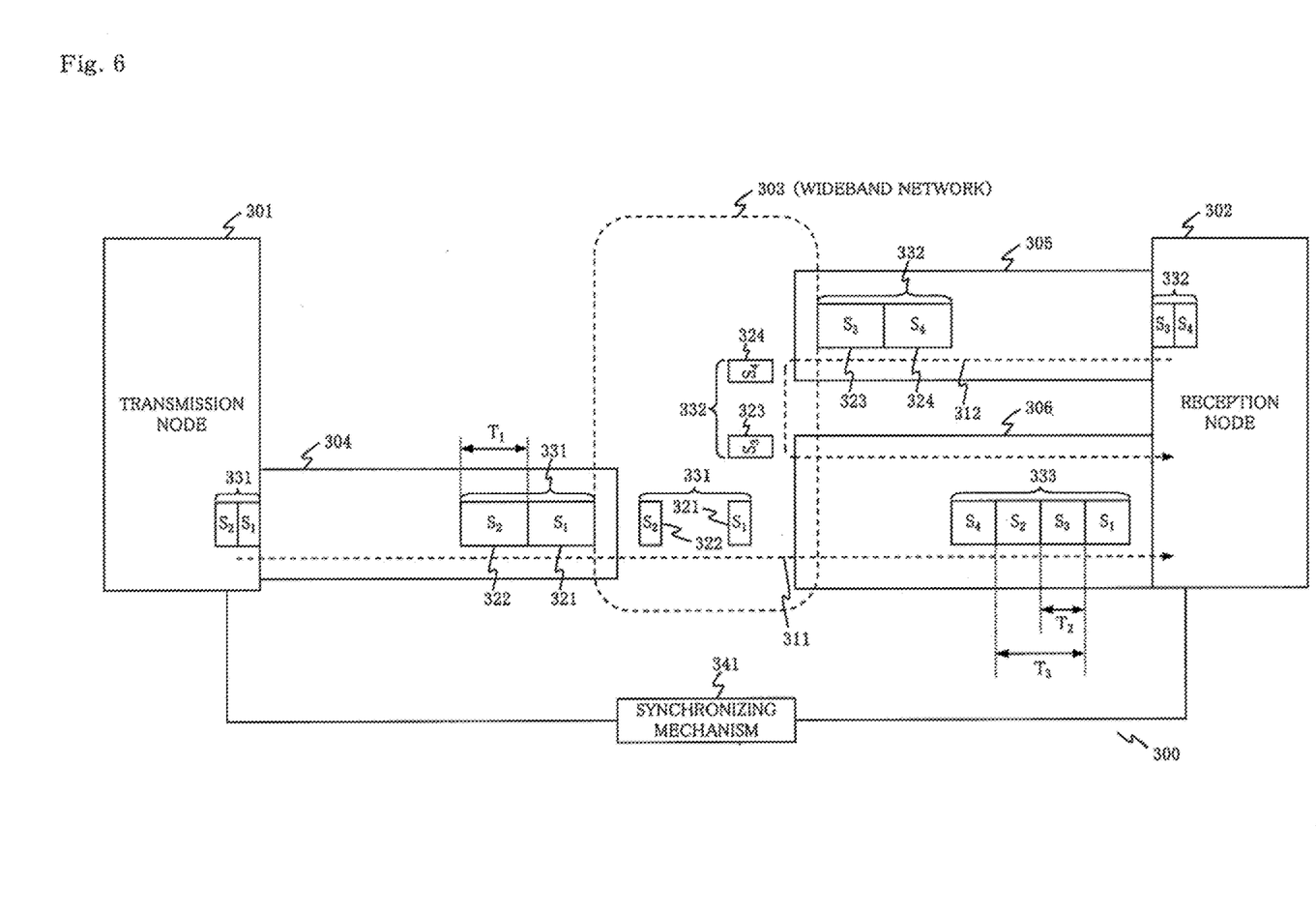
FIG. 6 is a system configuration diagram showing the configuration of a link band estimating system according to a third example of the present invention.

FIG. 6 shows the configuration of a link band estimating system according to the third example. Link band estimating system 300 includes transmission node 301 for transmitting first and second packets 321, 322 having first and second sequence numbers $S_1$, $S_2$, and reception node 302 for receiving packets 321, 322 transmitted from transmission node 301. Reception node 302 also transmits and receives third and fourth packets 323, 324 having third and fourth sequence numbers $S_3$, $S_4$ under certain measuring conditions.

Wideband network 303 is present in communication routes between transmission node 301 and reception node 302. First narrowband link 304 is connected between transmission node 301 and wideband network 303. Second narrowband link 305 and third narrowband link 306 are connected parallel to each other between wideband network 303 and reception node 302.

Link band estimating system 300 has two transmission routes, i.e., first transmission route 311 and second transmission route 312. First transmission route 311 is a route which extends from transmission node 301 through first narrowband link 304 to wideband network 303 and from thence through third narrowband link 306 to reception node 302, as indicated by the broken lines in FIG. 6. Second transmission route 312 is a loop-back route which extends from reception node 302 through second narrowband link 305 to wideband network 303 and from thence through third narrowband link 306 back to reception node 302, as indicated by the broken lines in FIG. 6.

As with the first example, link band estimating system 300 according to the third example causes a load to be disposed on third narrowband link 306 as a link to be measured through first transmission route 311 including first narrowband link 304 and second transmission route 312 including second narrowband link 305. According to the third example, the band of third narrowband link 306 which is wider than the band of first narrowband link 304 and second narrowband link 305 can also be measured by simultaneously placing first transmission route 311 and second transmission route 312 under a load.

First packet train 331 comprising first and second packets 321, 322 having first and second sequence numbers $S_1$, $S_2$ is transmitted from transmission node 301, and second packet train 332 comprising third and fourth packets 323, 324 having third and fourth sequence numbers $S_3$, $S_4$ is transmitted from reception node 302 to pose third packet train 333 as a load on third narrowband link 306. Synchronizing mechanism 341 is connected between transmission node 301 and reception node 302 for synchronizing transmission node 301 and reception node 302. Synchronizing mechanism 341 synchronizes the transmission of first packet train 331 and the transmission of second packet train 332. The transmission of first packet train 331 and the transmission of second packet train 332 may be synchronized by means other than synchronizing mechanism 341. Alternatively, the total data length of either first packet train 331 or second packet train 332 may be sufficiently increased to cause the packet trains to overlap each other without the need for accurate control over the transmission time of the other packet train.

Link band estimating system 300 is capable of recognizing fast links and effectively utilizing them. The related art of the present invention which is unable to effectively utilize fast links will be described below.

Figure 7:
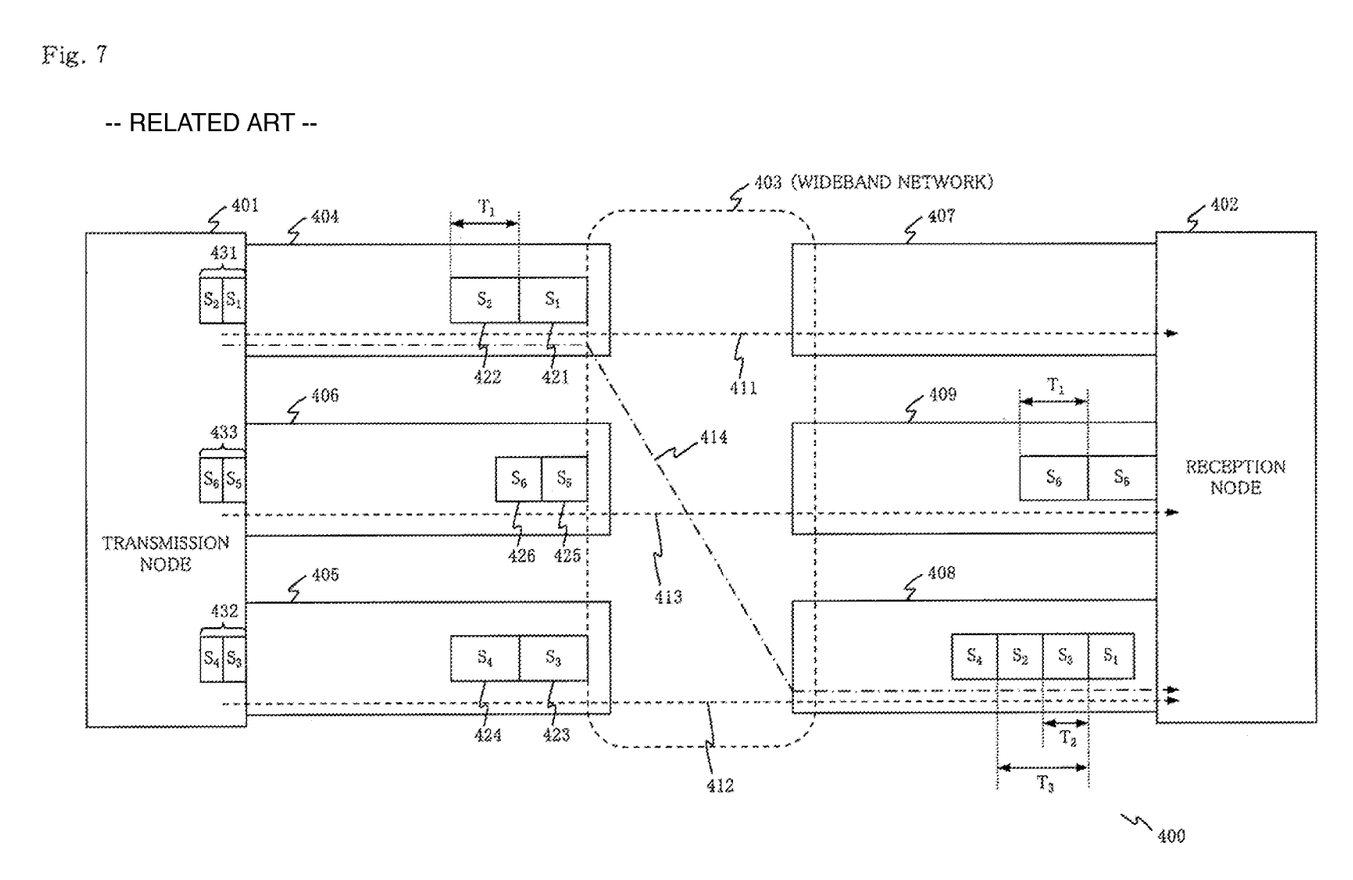
FIG. 7 is a system configuration diagram of a link band estimating system for optimizing route settings according to the related art of the present invention.

FIG. 7 shows the configuration of a link band estimating system for optimizing route settings to be used for a load dispersion between two nodes according to the related art of the present invention. Link band estimating system 400 includes transmission node 401 for transmitting first through sixth packets 421 through 426 having first through sixth sequence numbers $S_1$ through $S_6$, and reception node 402 for receiving these packets 421 through 426 transmitted from transmission node 401. Transmission node 401 comprises a first communication apparatus, not shown, for transmitting moving images via a wireless path, for example, and reception node 402 comprises a second communication apparatus, not shown, mounted on a moving vehicle, for example.

Wideband network 403 is present in communication routes between transmission node 401 and reception node 402. First and second narrowband links 404, 405 of a low rate mode and third narrowband link 406 of a high rate mode are connected between transmission node 401 and wideband network 403. Fourth and sixth narrowband links 407, 409 of a low rate mode and fifth narrowband link 408 of a high rate mode are connected parallel to each other between wideband network 403 and reception node 402. The low rate mode has a rate of 64 kbps (kilobits/second), and the high rate mode has a rate of 384 kbps, assuming that the 384 kbps rate is applied to W-CDMA (Wideband Code Division Access) lines.

Link band estimating system 400 has first through third transmission routes 411 through 413. Of these transmission routes, first transmission route 411 is a route which extends from transmission node 401 through first narrowband link 404 to wideband network 403 and from thence through fourth narrowband link 407 to reception node 402, as indicated by the broken lines in FIG. 7. Second transmission route 412 is a route which extends from reception node 402 through second narrowband link 405 to wideband network 403 and from thence through fifth narrowband link 408 to reception node 402, as indicated by the broken lines in FIG. 7. Third transmission route 413 is a route which extends from transmission node 401 through third narrowband link 406 to wideband network 403 and from thence through sixth narrowband link 409 to reception node 402, as indicated by the broken lines in FIG. 7.

Transmission node 401 transmits first packet train 431 comprising first and second packets 421, 422 which have successive first sequence number $S_1$ and second sequence number $S_2$, via first transmission route 411. Transmission node 401 also transmits second packet train 432 comprising third and fourth packets 423, 424 which have successive third sequence number $S_3$ and forth sequence number $S_4$, via second transmission route 412. Furthermore, transmission node 401 transmits third packet train 433 comprising fifth and sixth packets 425, 426 which have successive fifth sequence number $S_5$ and sixth sequence number $S_6$, via third transmission route 413.

Attention is focused on third narrowband link 406 of link band estimating system 400. Transmission node 401 transmits third packet train 433 comprising fifth and sixth packets 425, 426 to third transmission route 413. Reception node 402 then receives third packet train 433 from sixth narrowband link 409 of the low rate mode. The band of sixth narrowband link 409 is measured from packet reception interval $T_1$.

In third transmission route 413, third narrowband link 406 is higher in rate than sixth narrowband link 409. Therefore, sixth narrowband link 409 can be measured. In second transmission route 412, the band of second narrowband link 405 of the low rate mode is measured as a bottleneck band. However, the measured result fails to provide information indicating that fifth narrowband link 408 is higher in rate than second narrowband link 405.

In order to effectively utilize the band of third narrowband link 406 and fifth narrowband link 408 which are of the high rate mode, it is necessary to establish a route including both of these links. However, insofar as only the bands of first through third transmission routes 411 through 413 are to be measured, it cannot be detected that such a route can be established.

To circumvent such a difficulty, it may be proposed to periodically measure the band of a route other than three transmission routes 411 through 413 that are being presently established. In this case, when a route including third narrowband link 406 and fifth narrowband link 408 which are of the high rate mode is measured, it is detected that this route has a band which is equal to a link of the high rate mode. Such a route will hereinafter be referred to as a high rate route. Whether a high rate route is present or not cannot be confirmed unless all combinations of transmission- and reception-side narrowband links are tried.

With link band estimating system 300 according to the third example shown in FIG. 3, however, the band of an individual candidate route is not measured. According to the third example of the present invention, the band of an individual link is measured using the process of estimating a band as described above with respect to the first and second examples. If a route extending through first narrowband link 404 to wideband network 403 and from thence through fifth narrowband link 408 to reception node 402 is referred to as fourth transmission route 414, then fifth narrowband link 408 is measured as a high rate link by simultaneously disposing a load on fourth transmission route 414 and second transmission route 412.

When fifth narrowband link 408 is measured using fourth transmission route 414 and second transmission route 412, remaining third transmission route 413 connected to transmission node 401 is excluded from measurement. However, it is reliably detected that fifth narrowband link 408 is higher in rate than first and second narrowband links 404, 405. Similarly, third narrowband link 406 is measured as a high rate link according to the second example.

It is possible to confirm whether or not a high rate route can be established by measuring all narrowband links 404 through 409 as described above. According to the process of the background art, if the band of each candidate route is measured by a packet dispersion process, then as many routes as the product of the number of transmission-side narrowband links and the number of reception-side narrowband links at maximum need to be confirmed to check whether a high rate route is present or not. According to the present example, whether a high rate route is present or not can be confirmed by measuring as many routes as the sum of the number of transmission-side narrowband links and the number of reception-side narrowband links at maximum. According to the present example, therefore, it is possible to detect that a high rate route is present with a smaller number of measurement cycles, and the amount of processing and communication required to effectively utilize bands can be reduced.

The arrangements of transmission node 301 and reception node 302 of link band estimating system 300 according to the third example are essentially identical to those shown in FIGS. 3 and 4, and will not be illustrated and described below. However, reception node 302 of link band estimating system 300 has essentially the same functions as transmission node 101 shown in FIG. 3.

In each of the examples described above, one narrowband link is connected to two narrowband links through a wideband network. However, the number of connected links is not limited to the above number. In the examples, packet delivery timing generator 153 and packet reception timing generator 163 have essentially the same circuit timing for synchronization though not specifically described.

In the second example, the loop-back route whose start and end points belong to one node is associated with the reception node. However, a loop-back route may be associated with the transmission node.

The present invention has been described above in reference to the exemplary embodiment thereof. However, the present invention is not limited to the above exemplary embodiment. Various changes that can be understood by those skilled in the art can be made in the configurations and details of the present invention within the scope of the present invention.

The present application is the National Phase of PCT/JP2008/054355, filed Mar. 11, 2008, which claims priority based on Japanese patent application No. 2007-140168 filed on May 28, 2007, and incorporates herein the disclosure thereof in its entirety by reference.

The invention claimed is:

1. A link band estimating apparatus, for communication between nodes that connect to a network via a radio link or a plurality of radio links and between nodes that communicate to one another via a plurality of networks that are different from each other, comprising:
hardware;
a packet transmitting unit implemented at least by the hardware to transmit a plurality of packets transmitted from each of a plurality of communication routes via a link to be measured from among radio links;
a packet interval measuring unit implemented at least by the hardware to measure an interval by which said packets are spaced apart in the link to be measured on the communication routes; and
a band calculating unit implemented at least by the hardware to calculate the band of the link to be measured based on a value measured by said packet interval measuring unit and a data size of said packets, wherein
a transmission node of the nodes is connected to the network via links that are connected in parallel,
a reception node is connected to the network via one or more links, including the link to be measured, that are connected in parallel,
the communication routes include communication paths that are formed between the transmission node and the reception node, each communication path including a corresponding link, the link to be measured, and the network,
a first packet and a third packet of the packets are continuous in the link to be measured, resulting from the link band estimating apparatus transmitting a first row of packets consisting of plural packets including the first packet from the transmission node to a first link from among the links, and transmits a second row of packets consisting of plural packets including the third packet from the first node to a second link from among the links, the interval is an interval by which the packets, included in the first row of packets, are spaced apart from one another in the link to be measured is measured, and the band of the link to be measured is calculated according to the interval and according to the data size of each packet.

2. The link band estimating apparatus according to claim 1, wherein said packet transmitting unit adjusts the data size of the packets to be transmitted to a predetermined data size.

3. A link band estimating apparatus, for communication between nodes that connect to a network via a radio link or a plurality of radio links and between nodes that communicate to one another via a plurality of networks that are different from each other, comprising:

hardware;

a packet transmitting unit implemented at least by the hardware to transmit a plurality of packets transmitted from each of a plurality of communication routes via a link to be measured from among radio links to a plurality of communication routes which share one end of the link to be measured and which have a band narrower than the link to be measured;

a packet receiving unit implemented at least by the hardware to receive the packets transmitted by said packet transmitting unit from another end of said link to be measured;

an arrival interval measuring unit implemented at least by the hardware to measure an arrival interval of the packets received by said packet receiving unit; and a band calculating unit implemented at least by the hardware to calculate the band of the link to be measured based on a result measured by said arrival interval measuring unit, wherein a transmission node of the nodes is connected to the network via links that are connected in parallel, a reception node is connected to the network via one or more links, including the link to be measured, that are connected in parallel, the communication routes include communication paths that are formed between the transmission node and the reception node, each communication path including a corresponding link, the link to be measured, and the network, a first packet and a third packet of the packets are continuous in the link to be measured, resulting from the link band estimating apparatus transmitting a first row of packets consisting of plural packets including the first packet from the transmission node to a first link from among the links, and transmits a second row of packets consisting of plural packets including the third packet from the first node to a second link from among the links, the interval is an interval by which the packets, included in the first row of packets, are spaced apart from one another in the link to be measured is measured, and the band of the link to be measured is calculated according to the interval and according to the data size of each packet.

4. The link band estimating apparatus according to claim 3, wherein said link to be measured serves as part of a loop-back route whose start and end points belong to one node.

5. A link band estimating method comprising:

the packet delivering step of delivering a plurality of packets transmitted from each of a plurality of communication routes via a link to be measured from among radio links by a packet transmitting unit implemented at least in hardware;

the packet interval measuring step of measuring an interval by which said packets delivered by said packet delivering step are spaced apart in a zone of the communication routes by a packet interval measuring unit implemented at least in the hardware; and the band calculating step of calculating the band of the link to be measured based on a value measured by said packet interval measuring step and a data size of said packets by a band calculating unit implemented at least in hardware, wherein a transmission node of the nodes is connected to the network via links that are connected in parallel, a reception node is connected to the network via one or more links, including the link to be measured, that are connected in parallel, the communication routes include communication paths that are formed between the transmission node and the reception node, each communication path including a corresponding link, the link to be measured, and the network, a first packet and a third packet of the packets are continuous in the link to be measured, resulting from transmission of a first row of packets consisting of plural packets including the first packet from the transmission node to a first link from among the links, and transmission of a second row of packets consisting of plural packets including the third packet from the first node to a second link from among the links, the interval is an interval by which the packets, included in the first row of packets, are spaced apart from one another in the link to be measured is measured, and the band of the link to be measured is calculated according to the interval and according to the data size of each packet.

6. The link band estimating method according to claim 5, wherein said packet delivering step includes the step of adjusting the data size of the packets to be delivered to a predetermined data size.

* * * * *